Jan. 3, 1967 K. BELL ETAL 3,295,466
METHOD AND APPARATUS FOR FORMING ICE CREAM AND LIKE MATERIALS
Filed Jan. 13, 1964 5 Sheets-Sheet 5
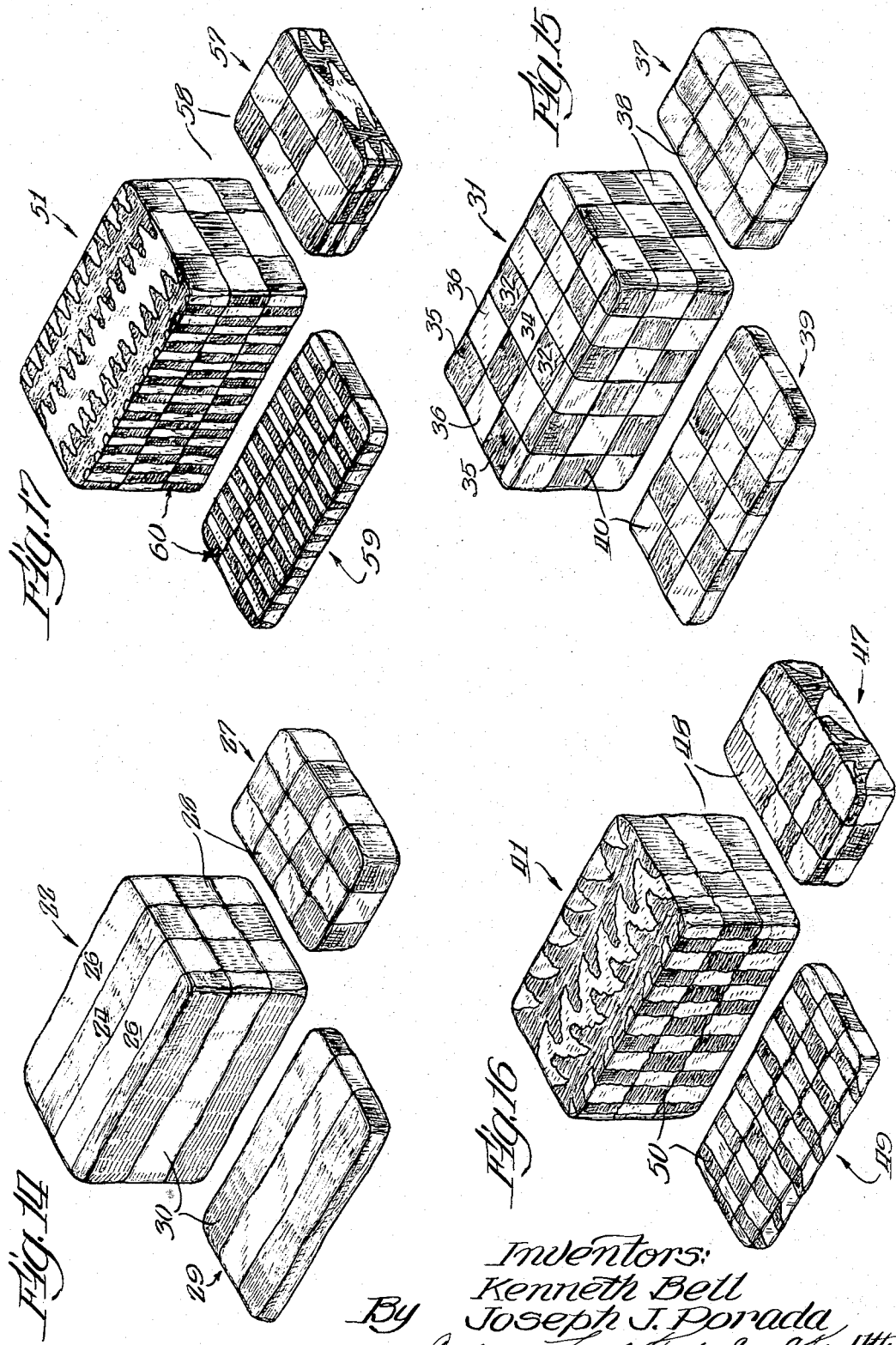
Inventors:
Kenneth Bell
Joseph J. Porada United States Patent Office 3,295,466
Patented Jan. 3, 1967

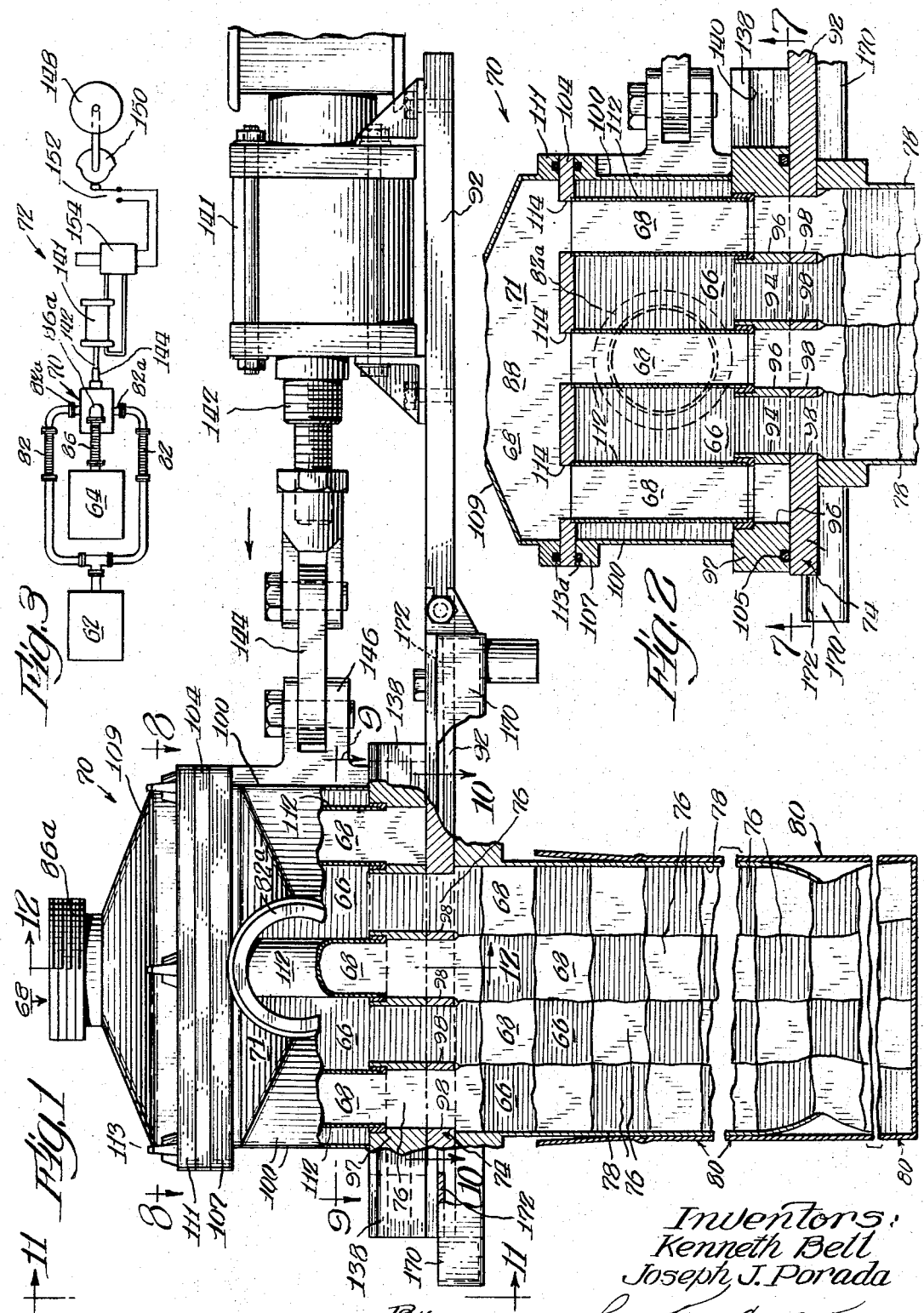

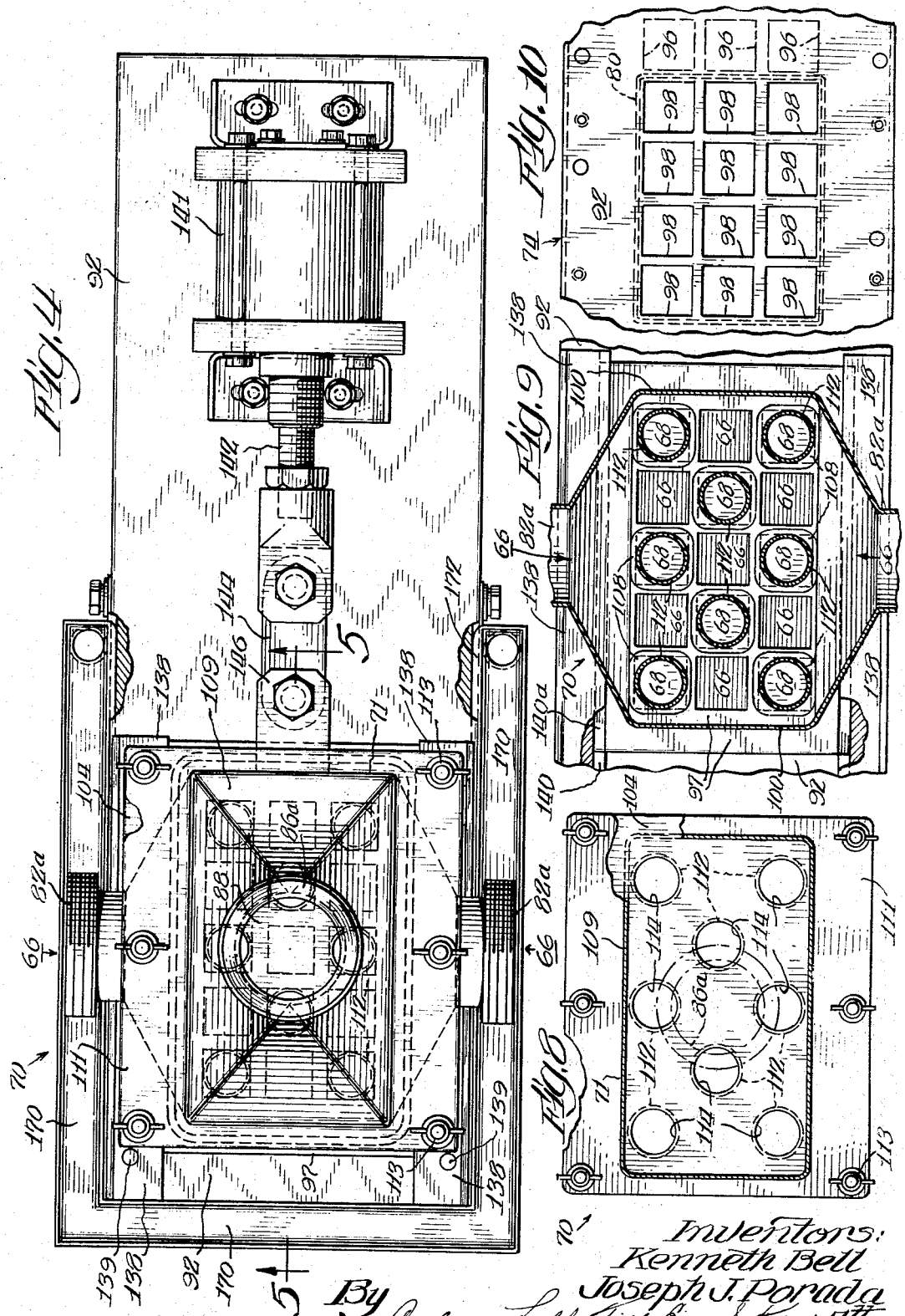

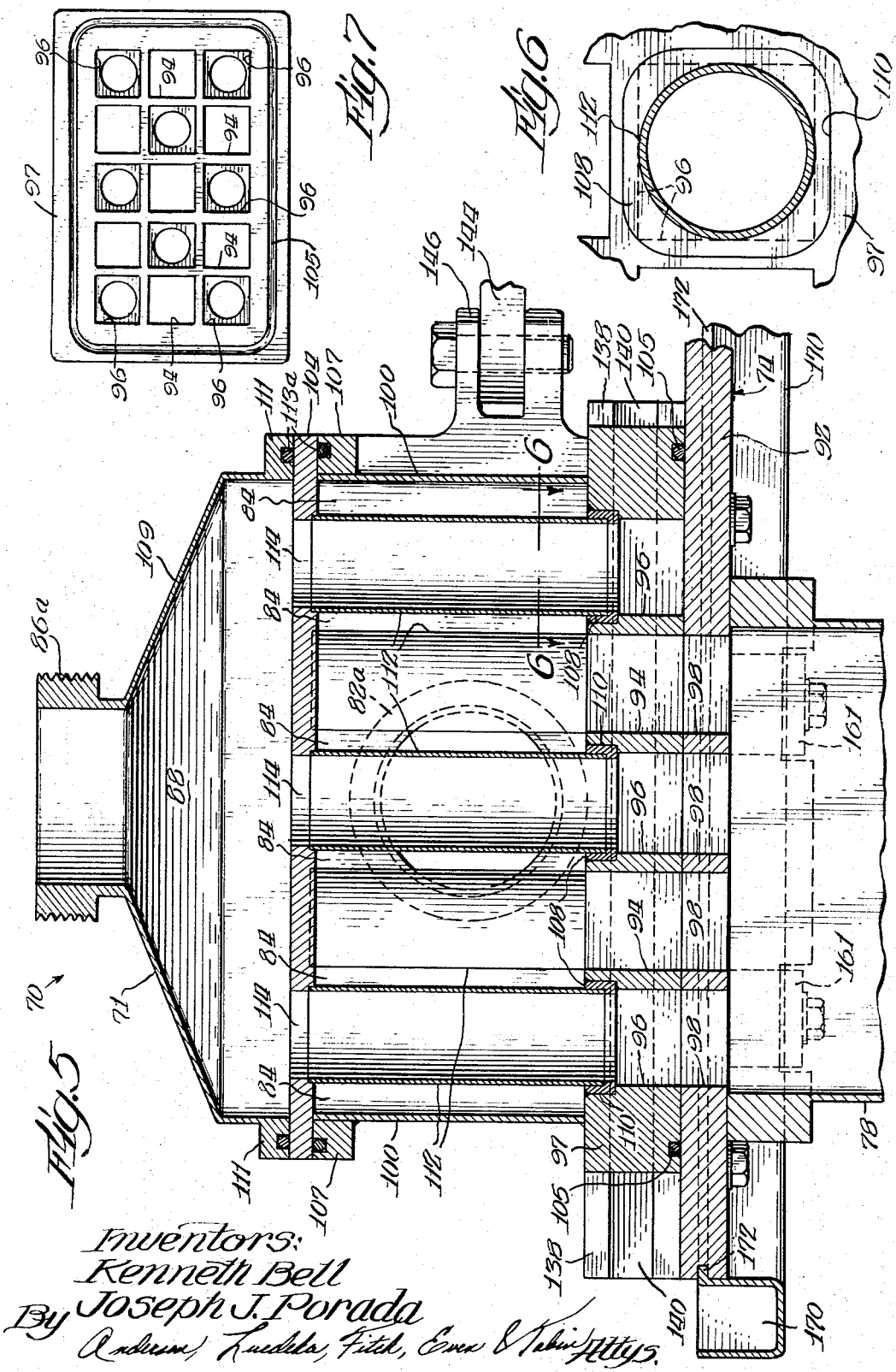

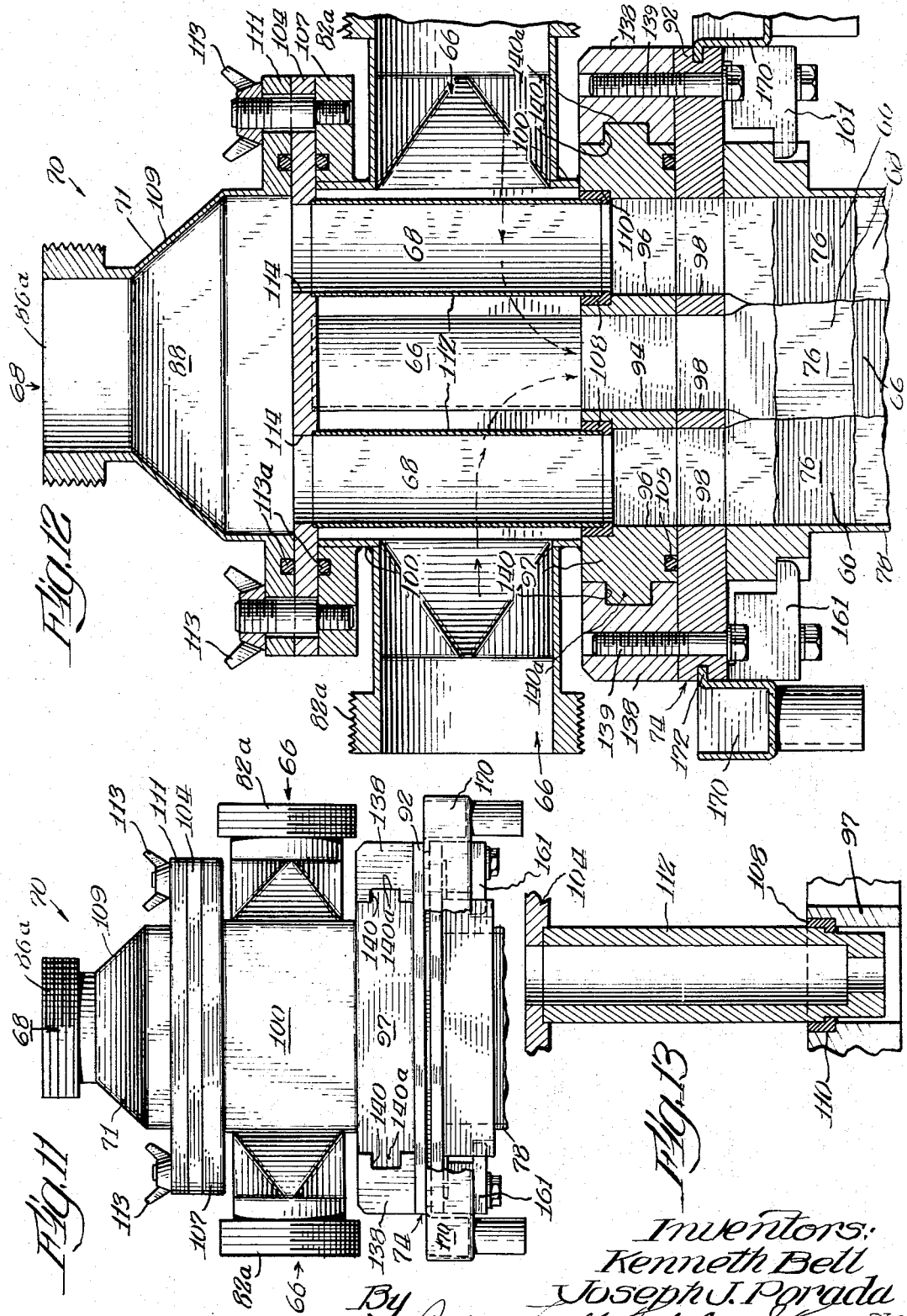

3,295,466
METHOD AND APPARATUS FOR FORMING
ICE CREAM AND LIKE MATERIALS
Kenneth Bell, Marengo, and Joseph J. Porada, Norridge, Ill., assignors to National Dairy Products Corporation, New York, N.Y., a corporation of Delaware
Filed Jan. 13, 1964, Ser. No. 337,991
10 Claims. (Cl. 107—1)

This invention relates to the manufacture of ice cream products; and, more particularly, to the manufacture of blocks of ice cream, and the products thereof, having patterns of contrasting colors; and still more particularly, to the manufacture of ice cream having patterns of contrasting colors in three dimensions.

Various means are known in the ice cream trade for manufacturing patterned ice cream products, for example, the well-known three flavor bricks of ice cream wherein the flavors are usually each of a different color and flavor and are arranged in layers extending through the brick. Special designs, such as a Santa Claus head or a Shamrock extending through the center of a block of ice cream, are also common. In these blocks, the different color portions of the patterns extend in one plane of the entire block of ice cream. Other multi-flavored and/or multi-colored ice creams, such as ripple ice creams, are also well-known in the trade. Ripple ice creams, however, usually incorporate streaks of flavoring material, such as chocolate or raspberry materials.

However, available apparatus has not provided means for providing patterned ice cream, which, when cut in any of three perpendicular planes provides a multiple ice cream pattern in each dimension.

It is a primary object of this invention to provide improved means for manufacturing a patterned ice cream product and the product of such means. Another object is the provision of a new and useful method and apparatus for manufacturing a patterned ice cream product wherein a pattern is provided in three dimensions of the product.

A still further object is provision of a new and useful method and apparatus for making an ice cream block having abutting columns of contrasting colors and wherein the columns have transversely overlapping parts of contrasting colors, thereby providing a checkerboard pattern in each of three dimensions.

These and other objects of the invention are more particularly set forth in the following detailed description and drawings in which:

FIGURE 1 is a fragmentary side view, partially broken away and partialy in cross-section, of an embodiment of the invention illustrated in the form of apparatus for making a patterned ice cream block, the apparatus having a slide in a first position;

FIGURE 2 is a fragmentary side view, partially in cross-section, similar to a portion of FIGURE 1, but with the patterning slide in a second position;

FIGURE 3 is a schematic view of control and actuating means for operating the apparatus;

FIGURE 4 is a top view of the apparatus in the position shown in FIGURE 1;

FIGURE 5 is an enlarged, fragmentary side sectional view taken generally along the line 5—5 in FIGURE 4;

FIGURE 6 is an enlarged, fragmentary horizontal sectional view taken generally along the line 6—6 in FIGURE 5;

FIGURE 7 is a horizontal view looking upwardly generally along the line 7—7 in FIGURE 2, and showing a bottom face of the patterning slide;

FIGURE 8 is a top sectional view taken generally along the line 8—8 in FIGURE 1, with parts broken away for clearer illustration;

FIGURE 9 is a horizontal sectional view taken generally along the line 9—9 in FIGURE 1;

FIGURE 10 is a horizontal sectional view taken generally along the line 10—10 in FIGURE 1;

FIGURE 11 is a fragmentary, left and elevational view taken generally along the line 11—11 in FIGURE 1, with parts broken away and removed for clearer illustration;

FIGURE 12 is an enlarged, fragmentary vertical sectional view taken generally along the line 12—12 in FIGURE 1;

FIGURE 13 is a longitudinal sectional view of a modified nozzle of the machine;

FIGURE 14 is a perspective view of a two-dimensional checkerboard patterned ice cream block;

FIGURE 15 is a perspetcive view of a three-dimensional checkerboard patterned ice cream block;

FIGURE 16 is a perspective view of a three-dimensional zig-zag patterned ice cream block; and FIGURE 17 is a perspective view of another three-dimensional zig-zag patterned ice cream block.

This invention is, in brief, directed to the manufacture of an ice cream block having abutting columns of contrasting colors and/or flavors of ice cream. In manufacturing such an ice cream block a stream of soft-frozen ice cream having a preselected color and/or flavor is directed into side by side abutting relationship with another stream of soft-frozen ice cream having a different color and/or flavor thus forming adjacent columns of contrasting colors and/or flavors. Just prior to flowing into such abutting relationship, the streams may be concurrently moved back and forth transversely of their direction of flow to cause the ice creams to overlap each other transversely of the columns. By varying the back and forth motion of the streams, various patterns such as zig-zag pattern, a checkered pattern or a three-dimensional checkerboard pattern for example, may be formed.

In accord with this invention, a machine for making such patterned ice cream blocks is provided and it includes a housing which defines a pair of chambers which receive the flow of soft frozen ice creams. These ice creams are delivered to the chambers of the housing from ice cream freezers or the like through suitable conduit means, with one chamber receiving an ice cream of a preselected color and flavor and the other chamber receiving an ice cream of a different color and/or flavor.

The housing further includes a plurality of ports which are in fluid communication with the chambers so that adjacent ports receive ice creams of different flavor and/or color, and discharge them in side by side relationship.

The machine further comprises a plate having an opening or openings through which flow the ice creams discharged from the ports of the housing. Actuating means is provided for operating the machine to alternate the ice creams which flow through the openings of the plate, and more particularly for effecting movement of the ports of the housing relative to the openings of the plate, in a direction transverse of the flow of ice creams. The plate is relatively thin and its thickness is not functionally related to the desired block formation.

With reference to the drawings, FIGURES 1 to 13, inclusive, are directed to apparatus for making the contrasting color and/or flavor ice cream blocks illustrated in FIGURES 14 to 17, inclusive.

With particular reference to FIGURE 14 of the drawing, there is illustrated an ice cream block 2, comprising longitudinal columns of ice creams having contrasting colors, such as dark columns 24 and light columns 26. It will be seen that a transverse slice 27 through the block 22 will present faces 28 having a checkerboard pattern, whereas a longitudinal slice 29 through the block will present faces 30 having a striped pattern.

In FIGURE 15 there is illustrated an ice cream block 31 having a three-dimensional checkerboard pattern, rather than the two-dimensional checkerboard pattern of the block 22 of FIGURE 14. The block 31 comprises longitudinal columns 32 and 34 which are each defined by generally cubic elements including dark colored elements 35 and light colored elements 36. In each column, each such element is positioned adjacent a similarly shaped element of contrasting color, and is surrounded by similarly shaped elements of contrasting color from adjacent columns.

It will be seen that a transverse slice 37 through the block 31 will present faces 38 having a checkerboard pattern, and that a longitudinal slice 39 through the block will also present faces 40 having a checkerboard pattern. Obviously, a longitudinal slice through the block 31 at right angles to the longitudinal slice 39 will also present faces having a checkerboard pattern. Thus, the block 31 has a checkerboard pattern in three perpendicular planes, and is referred to herein as having a three-dimensional checkerboard pattern.

The apparatus of the present invention may be operated to provide ice cream blocks of the type illustrated in FIGURES 14 and 15, and may also be operated to provide the ice cream blocks illustrated in FIGURES 16 and 17. In FIGURE 16 there is illustrated an ice cream block 41 having a three-dimensional zig-zag pattern, in which a transverse slice 47 presents faces 48 having a more complex regular pattern, and in which a longitudinal slice 49 presents faces 50 having a generally similar regular pattern. In FIGURE 17 there is illustrated an ice cream block 51 having another three-dimensional zig-zag pattern, in which a transverse slice 57 presents faces 58 having a still more complex regular pattern and in which a longitudinal slice 59 presents faces 60 having a generally similar pattern.

It should be understood that wherever reference is made herein to "ice cream," it is not intended to restrict the teachings of the present invention to ice cream alone. On the contrary, the present invention is equally applicable to ice milks, sherbets, or any other frozen dessert in which a three-dimensional pattern is desired. Accordingly, as used herein, "ice cream" should be construed to include other frozen desserts as well.

FIGURES 1–12 illustrate apparatus for the manufacture of a three-dimensional checkerboard ice cream block like that shown in FIGURE 15. With particular reference to FIGURE 3, there are provided conventional ice cream freezers 62 and 64 for delivering contrasting color and/or flavor soft frozen ice creams to a dispensing head 70. Ice cream freezers 62 delivers, for example, chocolate ice cream, while ice cream freezer 64 delivers, for example, vanilla ice cream. Actuating means 72 is provided for reciprocating the head 70 back and forth as it discharges the ice creams.

With particular reference to FIGURES 1 and 2, the ice creams delivered to the head 70 are contained in a housing 71 which is divided into two separate chambers. The chocolate ice cream 66, for example, is contained in a first chamber, and the vanilla ice cream 68 is contained in a second chamber, which chambers will be more particularly described hereinafter.

The chocolate ice cream 66 and the vanilla ice cream 68 are discharged from their respective chambers in the housing 71 to an outlet means 74 through which flow the chocolate and vanilla ice creams and in which they are formed into columns. As the ice creams are discharged from the outlet means 74, they are shaped into columns 76 which, as they move downwardly from the outlet means 74, are brought into abutting relationship in a dispensing tube 78, and enter a container 80 fitted about the dispensing tube.

The actuating means 72, which effects relative movement of the housing 71 with respect to the outlet means 74, causes chocolate ice cream 66 and vanilla ice cream 68 to be alternately discharged from the outlet means 74, so that the columns of ice creams 76 are comprised of generally cubical elements, which provide the dark colored elements 35 and light colored elements 36 of the ice cream block 31 of FIGURE 15. The movement should be substantially immediate to provide best formation of the cubical elements. However, by varying the operation of the actuating means 72, the various ice cream blocks of FIGURES 14–17 may be obtained.

More particularly, in supplying a dark ice cream to the dispensing head 70, the freezer 62 is connected by flexible tubes 82 which connect to fittings 82a on opposite sides of the dispensing head 70 and communicate with a feed chamber 84 (FIGURE 5) in the housing 71. Similarly, the freezer 64 is connected by a flexible tube 86 to a fitting 86a on the top of the housing 71, which communicates with a second feed chamber 88.

The feed chambers 84 and 88 are in the housing 71, which is mounted for reciprocal movement on a plate 92 of the machine (FIGURES 1, 2, 5 and 12) forming part of the outlet means 74. The actuating means 72 causes the housing to reciprocate and as the mixes 66 and 68 are pumped through the feed chambers 86 and 88, respectively, they are discharged through ports 94 and 96, respectively, in the bottom wall member 97 of the housing 71.

As the housing 71 is reciprocated, the ports 94 and 96 slide over plate 92 which includes openings 98 through which the mixes are discharged into the dispensing tube 78 which is carried on the plate 92 (FIGURE 12). In the illustrated embodiment, the ports 94 and 96 and the openings 98 are square.

The housing 71 is reciprocated by the actuating means 72 between extreme positions at opposite ends of its stroke. The housing 71 is shown at a first extreme position at the right end of its stroke in FIGURE 1, and at a second extreme position at the left end of its stroke in FIGURE 2. With particular reference to FIGURES 5, 11 and 12, the housing 71 includes a vertical side wall 100 connected between the bottom member 97 and an upper plate 104. The bottom member 97 is provided with a continuous groove proportioned to receive a suitable seal, such as an O ring 105. The housing 71 further includes an outwardly-extending peripheral rim 107 which is attached to the side wall 100. A housing top 109 is also provided having another outwardly-extending rim 111 attached thereto. The rims 107 and 111 and the upper plate 104 are releasably clamped together by bolts and wing nuts 113. Seals, such as O rings 113a, may be provided in grooves in rims 107 and 111 to abut opposite sides of the upper plate 104. The housing 71 can therefore be readily disassembled for cleaning.

It will be seen that feed chamber 88 is defined by the housing top 109 and the upper plate 104.

The housing 71 further comprises tubes 112 which provide fluid communication between feed chamber 88 and the ports 96. One end of each tube 112 is secured in a hole 114 formed in the upper plate 104, and the other end of each tube 112 engages a seating member 108 which is recessed in a shoulder 110 which encompasses the port 96. (FIGURE 5.)

The other chamber 84 is within the portion of the housing 71 defined by the side wall 100, the bottom element 97 and the upper plate 104, and the space between the flow tubes 112. Opposed portions of the side wall 100 are integral with the fittings 82a connected with the flexible tubes 82 from the freezer 62, so that soft frozen ice cream entering the chamber 84 passes through the ports 94 in the bottom wall 97. Thus, the ice creams 66 and 68 are conducted through feed chambers 84 and 88 and are discharged, respectively, from ports 94 and 96.

In the illustrated embodiment, the ports 94 and 96 are arranged in rows in the bottom member 97 of the housing 71 (FIGURE 7). Each row has five ports 94 and 96 in the direction of reciprocal movement of the housing 71. Three rows of ports 94 and 96 are positioned side by side transversely of the reciprocal movement. It should be noted that in each row the ports 94 and 96 alternate, and that in the transverse direction, the ports 94 and 96 are similarly alternated so that the ports 94 which discharge ice cream 66 are spaced from each other by ports 96 which discharge ice cream 68.

As the soft frozen ice creams are discharged through ports 96 and 98, they pass through the openings 98 and into the dispensing tube 78. As may best be seen in FIGURE 10, the openings 98 in the plate 92 are arranged in rows of four openings each, in the direction of reciprocation, with three such rows transversely of the direction of reciprocation. The openings 98 are closely spaced and a port 94 or 96 is directly above each of the openings 98 when the housing 71 is in either of its extreme positions, as shown in FIGURES 1 and 2. When the housing 71 is in its extreme right hand position (FIGURE 1) a first group of the ports 94 and 96 is in register with the openings 98. The first group of ports 94, 96 excludes the right hand transverse row of openings since these are sealed off by the plate 92. In this extreme right hand position, adjacent openings 98 receive contrasting soft frozen ice creams 66 and 68.

Upon operation of the actuating means 72, the housing 71 is moved from its extreme right hand position, as shown in FIGURE 1, to its extreme left hand position, as shown in FIGURE 2, so that a second group of the ports 94, 96 is in register with the openings 98. In this position, the left hand transverse row of ports 94, 96 is out of register with the openings 98 and is sealed off by the plate 92. Since adjacent ports 94, 96 in the housing 71 dispense different ice creams, as the housing 71 is moved from one of its extreme positions to the other extreme positions, different ice creams are dispensed into each opening in the respective extreme positions.

As before noted, the actuating means 72 causes the housing to reciprocate on the plate 92 to cause alternate groups of ports 94, 96 to communicate with the openings 98. The actuating means 72 comprises a pair of guides 138 attached to the plate 92 by means of bolts 139. The guides are in transversely spaced, parallel relation and extend in the direction of reciprocating motion. Each guide 138 has an inwardly facing channel 140 slidably receiving an elongated rib 140a formed on the bottom wall 97 of the housing 71, as may best be seen in FIGURE 12.

The actuating means 72 for reciprocating the housing 71 between the extreme positions of its stroke includes a double acting pneumatic motor 141 attached to the plate 92, the motor having a plunger 142 connected by means of a link 144 to a tongue 146 fixed on the housing 71. Control means for the pneumatic motor 141 includes an electric motor 148 which rotates a cam 150 for opening and closing a switch 152 (FIGURE 3). The switch 152 may energize a solenoid actuated air valve 154 to cause the flow of air into the left hand end of the pneumatic motor 141, thus moving the housing 71 to its extreme right hand position as shown in FIGURE 1. As the cam 150 is rotated, the switch 152 is opened and the solenoid valve 154 is de-energized so that air flows into the right side of the pneumatic motor 141, causing the housing 71 to be moved to its extreme left position shown in FIGURE 2. The speed at which the housing 71 is moved between these extreme positions may be governed by varying the pressure of the air supplied to the pneumatic motor 141. The frequency of the reciprocation of the housing 71 may be controlled by varying the speed of the motor which drives the cam 150. Of course, other actuating means can also be used.

The dispensing tube 78 may be attached to the plate 92 in various ways as by detachable lugs 161 (FIGURE 12).

A generally U-shaped gutter 170 extends about three edges of the plate 92 adjacent the housing 71 to catch any drippings from the dispensing head 70. The gutter 170 has an inwardly directed flange 172 (FIGURE 12) seated in a peripheral groove in the plate 92, thus securing the gutter to the plate for easy removal.

In summary, the patterning process is accomplished in the following steps: Soft frozen ice creams 66 and 68 of contrasting color are supplied by the freezers 62 and 64 through the flexible tubes 82 and 86 and into the feed chambers 84 and 88 respectively. As the ice creams pass through the feed chambers they are each divided into a plurality of streams flowing in the same general direction with the lighter colored streams flowing out of the ports 94 in the form of bars and the darker colored streams flowing out of the ports 96, also in the form of bars. With the housing 71 at one of the extreme ends of its stroke, these streams flow through the square openings 98 and into abutting relationship in the dispensing tube 78 to form abutting columns of contrasting color. The housing 71, after a short bar has been extruded through the ports 94 and 96, is then moved, substantially immediately, by the actuating means 72, to the other extreme end of its stroke, i.e., from the position shown in FIGURE 1 to the position shown in FIGURE 2, so that each port is moved out of communication with a particular opening and into communication with an adjacent opening and therefore the differently colored ice creams overlap transversely of the columns. Thus, upstream of the point at which the streams flow into abutting relationship, the streams are moved back and forth transversely of their normal direction of flow, to cause the contrastingly colored ice creams to overlap each other transversely of the columns.

In this connection, the particular pattern of the ice cream which is provided by the apparatus of the present invention is functionally related to the rates of flow of soft-frozen ice creams through the head 70, the frequency of reciprocation of the housing 71, the velocity of the housing 71 between extreme positions as well as other variables. In a particular example, where the ice creams 66 and 68 were each supplied to the head 70 at a rate of about 10 gallons per minute, and air was supplied to the pneumatic motor 141 at a pressure of 40 p.s.i.g., reciprocation of the head 70 at a frequency of 70 cycles (140 strokes) per minute resulted in formation of the ice cream block 31 of FIGURE 15. With the other conditions remaining the same, a reciprocation frequency of 110 cycles per minute resulted in formation of the ice cream block 41 of FIGURE 16, and a reciprocation frequency of 200 cycles per minute produced ice cream block 51 of FIGURE 17.

When it is desired to form a block having solid color rows, as ice cream block 22 of FIGURE 14, the housing is held stationary at either end of its stroke throughout the entire operation.

Thus, an extremely versatile apparatus and method is provided for manufacturing patterned ice cream blocks. As described herein, the machine and method may be utilized for forming three-dimensionally patterned blocks wherein the patterns extend throughout the blocks, or the housing 71 may be held stationary to provide a two-dimensional checkerboard block. The machine may be adapted to forming parts having shapes other than those illustrated and described, for example, by changing the shape of the openings 98, and could be adapted to handle other shapes.

Various features of the invention are set forth in the following claims.

What is claimed is:

1. In apparatus for forming blocks of multicolored and multiflavored ice cream, the combination of a housing having a pair of chambers therein each containing a different ice cream, ports each communicating with a different one of said chambers, a plate having an opening therein, said plate and said housing being movable relative to each other, actuating means connected between said plate and said housing and operating to move said housing and said plate relative to one another whereby said opening moves into communication with each of said ports alternately, thereby permitting bars of ice cream to be discharged from said ports through said opening to form alternate short bars of different ice cream and provide an elongated column of ice cream with adjacent bars of different material, said plate having a thickness less than the length of the short bars of ice cream.

2. In apparatus for forming blocks of multicolored and multiflavored ice cream, the combination of a housing having a pair of chambers therein each containing a different ice cream, ports communicating with each of said chambers, a plate having openings therein fewer in number than said ports, said housing being disposed on said plate, said plate and said housing being movable relative to each other, and actuating means connected between said plate and said housing and operating to move said housing and said plate relative to one another whereby each of said openings moves into communication with different ones of said ports alternately, thereby permitting bars of ice cream to be discharged from said ports through said openings to form alternate short bars of ice cream and provide elongated columns of ice cream with each column having alternating bars of different materials, said plate having a thickness less than the length of the short bars of ice cream.

3. In apparatus for forming a block of different edible materials, the combination of a housing having first and second chambers and a generally flat bottom wall, said wall having a plurality of ports therein arranged in a row, alternate ones of said ports communicating with said first chamber and the intervening ports communicating with said second chamber, a generally flat plate having a plurality of openings fewer in number than said ports and arranged in a row aligned with said row of ports, and means supporting said housing and said plate for relative sliding movement back and forth longitudinally of said rows to bring each of said openings into registry first with a port of one of said chambers and then a port of the other chamber.

4. In apparatus for forming a block of different edible materials, the combination of a housing providing a plurality of chambers each for a different one of said materials, said housing having a plurality of ports arranged in a row with adjacent ports communicating with different ones of said chambers, a generally flat plate having a series of openings arranged in a row aligned with said row of ports, and means supporting said ports and said plate for relative movement back and forth longitudinally of said rows to bring each of said openings into registry with different ones of said ports, said plate obstructing a port on one end of said row in one position and port at the other end of the row in another position.

5. In apparatus for forming a block of different edible materials, the combination of means providing a plurality of chambers each adapted to contain a different one of said materials, discharge means having ports each communicating with a different one of said chambers, a plate having an opening therein disposed beneath said discharge means, actuating means connected to said discharge means and operable to shift the same across said plate to bring the ports alternately into communication with said opening thereby permitting said materials to be discharged from said ports alternately to form a column of short bars of the different materials alternating with each other.

6. In apparatus for forming a block of different edible materials, the combination of a housing having first and second chambers and a generally flat bottom wall, said wall having a plurality of ports therein arranged in a row, alternate ones of said ports communicating with said first chamber and the intervening ports communicating with said second chamber, a generally flat plate slidably supporting said housing and having a series of openings arranged in a row beneath said ports, said openings being fewer in number than said ports, and means guiding said housing for reciprocation longitudinally of said rows to bring each opening into registry first with a port of one of said chambers and then alternately with a port of the other chamber.

7. In apparatus for forming a block of different edible materials, the combination of a housing having a plurality of chambers and a generally flat bottom wall, said wall having a plurality of ports adjacent ones of which communicate with different ones of said chambers, an outlet means having a series of openings arranged beneath said ports, and means guiding said housing for movement back and forth above said outlet means to bring each opening into registry first with a port of one of said chambers and then with a port of another chamber so that a column extruded through the opening contains successive portions of the different materials from the respective chambers.

8. In a method of forming an edible product of different materials, the steps of advancing a plurality of columns of said different materials side by side, shifting said columns transversely after advance of the columns through a predetermined distance and simultaneously separating sections from their leading ends to dispose one column in the previously occupied position of another column, returning the columns transversely to their original positions after further advance of the columns and simultaneously separating additional sections from the leading ends of the columns, repeating the foregoing steps to produce columns with alternating sections of different materials, and bringing the columns of alternating sections into contact with each other with adjacent sections in adjacent columns formed of different materials.

9. The method of forming an ice cream block from different materials comprising the steps of forming at least two streams of said different materials, extruding said streams into contacting relation, rapidly shifting said streams laterally of their direction of flow to dispose a stream of each material in the position previously occupied by a stream of another of said materials and substantially simultaneously separating sections from the leading ends of the streams to form short bars in contact with each other, and repeating the foregoing steps to form contacting columns of said contacting bars of said different materials.

10. The method of forming an ice cream block from differing ice creams comprising the steps of forming at least two streams of said differing ice creams, extruding said streams into contacting relation for a period to form first short bars, rapidly interrupting the flow of said streams and substituting a stream of each ice cream for the stream of the other ice cream by shifting the streams laterally of their direction of flow to dispose a stream of each ice cream in the position previously occupied by a stream of the other ice cream, extruding the streams for a second period to form second short bars in contact with each other and said first short bars, and repeating the foregoing steps to form columns with alternating bars of different materials.

References Cited by the Examiner

UNITED STATES PATENTS

| | | | |
|---|---|---|---|
| 1,951,694 | 3/1934 | Goulstone | 107—54 X |
| 2,202,917 | 6/1940 | Oswalt | 107—1 |

OTHER REFERENCES

Culinary Arts Institute Encyclopedic Cookbook, Crosset and Dunlap, N.Y., 198 TX 715B48C3, page 203 (copy in Group 170).

WALTER A. SCHEEL, *Primary Examiner.*

J. SHEA, *Assistant Examiner.*